United States Patent [19]

Horyu

[11] 4,375,060
[45] Feb. 22, 1983

[54] ELECTRONIC APPARATUS HAVING SPECIAL KEY

[75] Inventor: Sakae Horyu, Yokohama, Japan

[73] Assignee: Canon Kabushiki Kaisha, Tokyo, Japan

[21] Appl. No.: 151,700

[22] Filed: May 20, 1980

[30] Foreign Application Priority Data

May 26, 1979 [JP] Japan .................................. 54-64583

[51] Int. Cl.³ .......................... G06F 3/02; H04L 15/00
[52] U.S. Cl. .............................. 340/365 R; 178/17 R; 178/17 C; 179/2 DP
[58] Field of Search ............. 340/365 R, 311, 825.44; 178/17 R, 17 C, 17 A, 17.5, 21, 79-81; 364/705, 709, 710; 179/90 K, 2 DP; 235/432, 430, 58 P; 400/472, 477, 479

[56] References Cited

U.S. PATENT DOCUMENTS

| | | | |
|---|---|---|---|
| 3,588,320 | 6/1971 | Guzak | 178/17 R |
| 3,808,363 | 4/1974 | Kieffer | 340/365 R |
| 3,833,765 | 9/1974 | Hilborn et al. | 178/17 C |
| 4,058,849 | 11/1977 | Fitzgerald et al. | 340/365 R |

Primary Examiner—James J. Groody
Attorney, Agent, or Firm—Fitzpatrick, Cella, Harper & Scinto

[57] ABSTRACT

Electronic apparatus having transmission capability of data from memory to a transmission line, such as a telephone line, having print-out capability of the data being transmitted, and having a control function, in response to actuation of a special key, to permit selection of either transmission and print out, or transmission only, as desired.

5 Claims, 16 Drawing Figures

ELECTRONIC APPARATUS HAVING SPECIAL KEY

BACKGROUND OF THE INVENTION

1. Field of the Invention

The present invention relates to an electronic apparatus, and more particularly to an electronic apparatus having a key for instructing a particular function.

2. Description of the Prior Art

There are already known electronic apparatus capable of emitting transmission signals for example to a telephone line and simultaneously printing the content of transmission. In case such apparatus is provided with a memory function, it has been customary to print out the content of the memory, principally for the purpose of confirmation, at the information read-out from said memory for the signal transmission to the telephone line. However, although the content of memory becomes confusing and requires confirmation in case there are provided plural memories of a same capacity, it is usually unnecessary to confirm to the content of the memory in case there is provided only one memory or a particular memory is different from other memories for example with respect to the capacity thereof. The confirmation by print-out is therefore unnecessary when the content of the memory is thus obvious. It is also desirable to minimize the paper consumption from economical consideration in case the print-out is to be performed on a costly recording paper such as thermal paper.

SUMMARY OF THE INVENTION

The object of the present invention is to provide an electronic apparatus provided with a special key allowing to select either all or a part of plural functions.

Another object of the present invention is to provide an electronic apparatus having a special key to select either the information transmission combined with simultaneous print-out or the information transmission without print-out.

Other objects of the present invention will be made apparent from the following description of the embodiments to be taken in conjunction with the attached drawings.

DETAILED DESCRIPTION OF THE PREFERRED EMBODIMENTS

Figure 1:
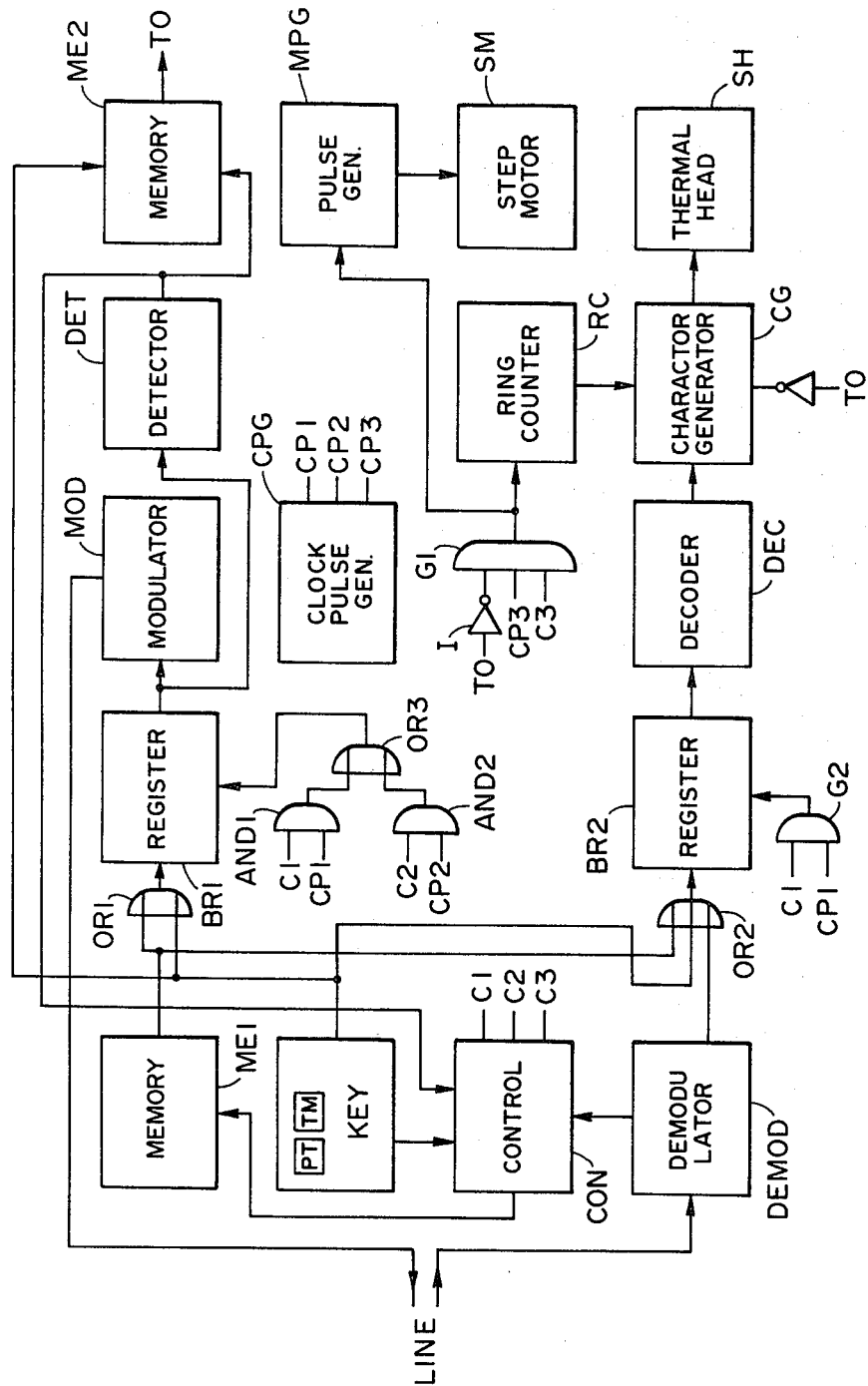
FIG. 1 is a block diagram of an embodiment of the present invention.

FIG. 1 shows an embodiment of the circuit for printing characters for example of $5 \times 7$ dot matrix by means of a thermal head of $1 \times 7$ dots on a thermal paper, in which a key circuit KEY generates signals of different codes according to the actuated key. Said key circuit KEY comprises a key PT for instructing the print-out and the transmission to a telephone line of the information stored in the memory, and a key TM for instructing the transmission alone to the telephone line of said information. The signals from said key circuit KEY are supplied to a control circuit CON, to a register BR1 through an OR gate OR1, to a register BR2 through an OR gate OR2 and to a memory ME2. Said memory ME2 memorizes the actuation of the key TM instructing the transmission of the information from the memory for example to a telephone line without the print-out of said information and continues to release a signal TO indicating the actuation of said key TM until it is cleared. A memory ME1 storing the information to be transmitted is connected to the register BR1 through the OR gate OR1.

The output from said register BR1 is supplied to a transmission signal modulating circuit MOD in which various codes are modulated into determined frequencies for transmission to the telephone line. The output signal from said register BR1 is also supplied to a detecting circuit DET which, upon detection of the termination of the information to be supplied to the register BR1, clears the memory ME2 to terminate the aforementioned signal TO indicating the actuation of the key TM. The output signal from said detecting circuit DET is also supplied to the control circuit CON.

Said control circuit CON generates control signals C1–C3 in response to the signals from the key circuit KEY and from a demodulating circuit DEMOD, and is also connected to the memory ME1. Said signals C1, C2 and C3 respectively controls the information write-in into the register BR1, signal transfer from said register BR1 to the demodulating circuit DEMOD and information print-out.

The demodulating circuit DEMOD demodulates the transmission signal received through the telephone line LINE and thus supplies coded signals to the register BR2 through the OR gate OR2. The output signal from said register BR2 is decoded by a decoder DEC and supplied to a character generator CG, which in turn provides output signals to seven signal lines of a thermal head SH in response to said output signal from the decoder DEC, the output signals to said thermal head SH being however suspended upon receipt of the aforementioned signals TO released in response to the actuation of the key TM.

A clock pulse generator CPG is provided for generating synchronizing pulses CP1 for the key circuit KEY, control circuit CON, memory ME1 etc., clock pulses CP2 for determining the signal transmission speed, and clock pulses CP3 for determining the print-out speed. Said synchronizing pulses CP1 and clock pulses CP2 from said clock pulse generator CPG are respectively supplied to AND gates AND1, AND2 in combination with control signals C1, C2 from the control circuit CON. The output signals from said AND gates AND1, AND2 are supplied to an OR gate OR3 of which output signal is supplied to the register BR1.

Also the clock pulses CP3 determining the print-out speed from the clock pulse generator CPG are supplied, together with the control signal C3 and the signal TO supplied through an inverter I, to an AND gate G1, of which output signal is supplied to a ring counter RC for determining the column of the 5×7 dot matrix signals generated by the character generator CG, and also to a motor drive pulse generator MPG for driving a stepping motor SM for step advancing the thermal head SH.

Also the register BR2 receives, through an AND gate G2, the signal C1 from the control circuit CON for controlling the signal write-in and the synchronizing pluse CP1 from the clock pulse generator CPG.

Figures 2A, 2B:
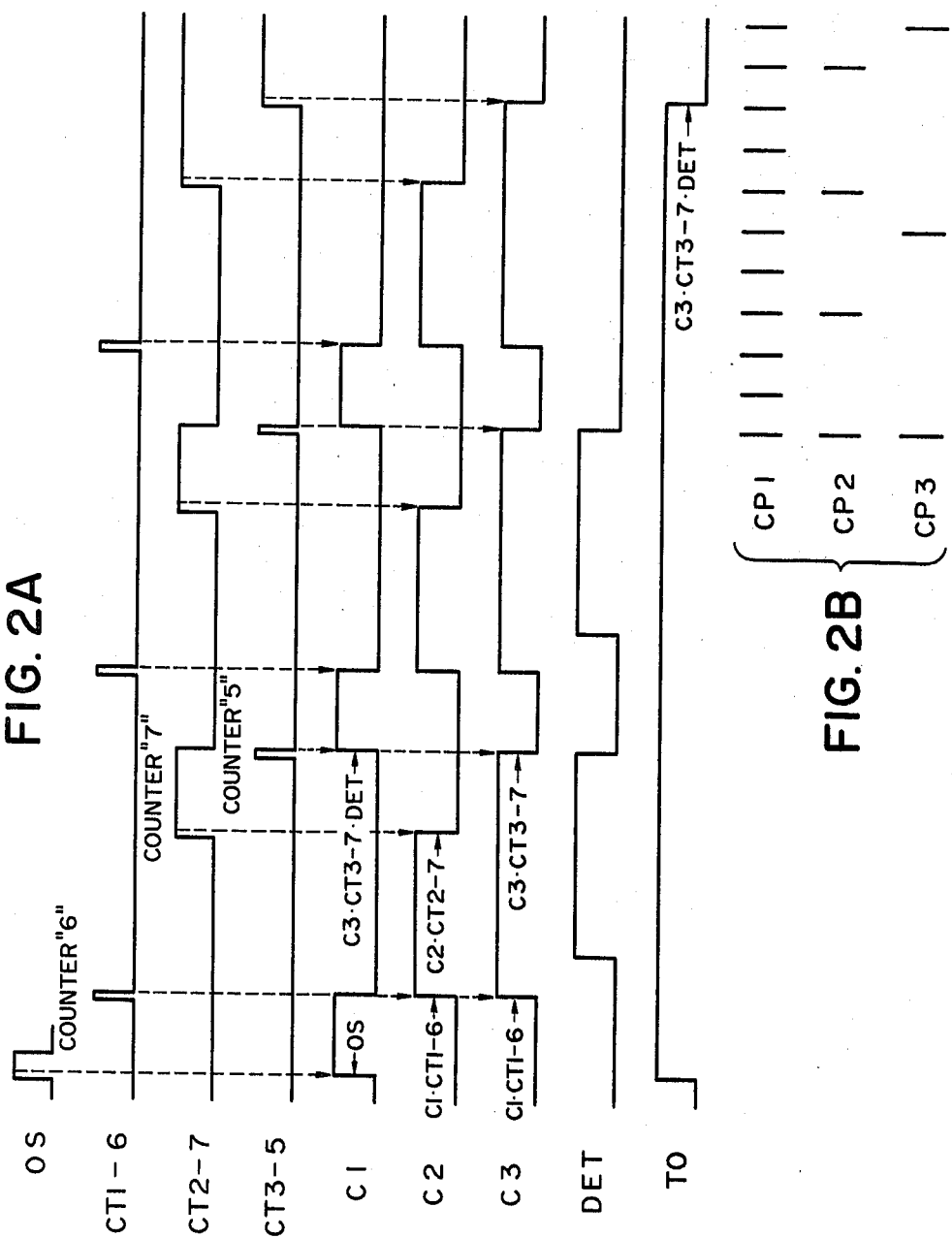
FIG. 2A is a timing chart showing various signals in the diagram of FIG. 1.
FIG. 2B is a timing chart of clock signals CP1-CP3.

The various circuits explained above are more specifically shown in FIGS. 3–8. Also FIGS. 2A and 2B are timing charts of various signals and the clock pulses CP1–CP3.

Now there will be explained the functions of these circuits along with the time when two characters stored in the memory ME1 are transmitted without print-out in response to the actuation of the key TM, while making reference to the attached drawings.

Figure 3:
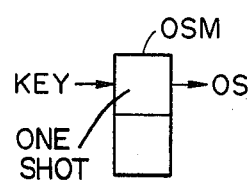
FIG. 3 is a diagram of key entry circiut.
Figure 5:
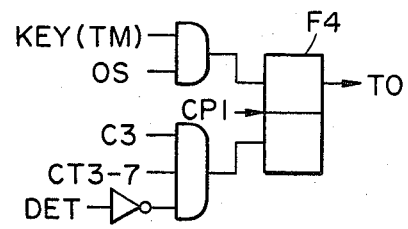
FIG. 5 is a diagram of memory ME2.
Figure 4A:
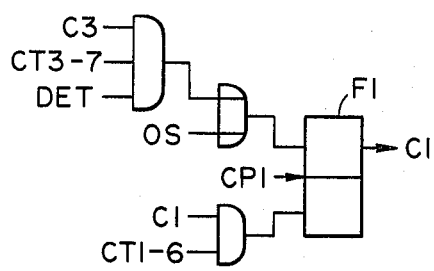
FIGS. 4A-4F show a detailed diagram of control circuit CON.
Figure 4B:
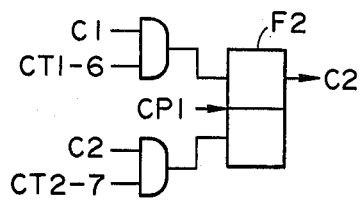
Figure 4C:
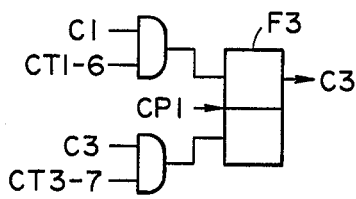
Figure 4D:
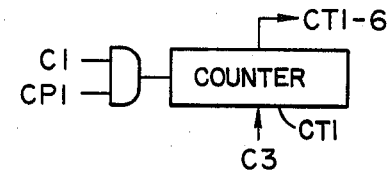
Figure 4E:
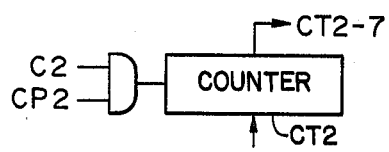
Figure 4F:
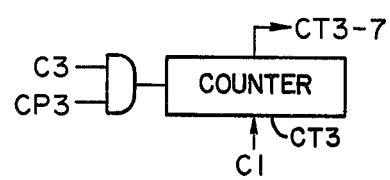
Figure 6:
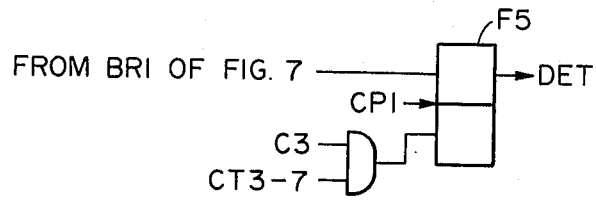
FIG. 6 is a diagram of detecting circuit DET.

Upon actuation of the key TM the key circuit KEY composed of a monostable multivibrator OSM as shown in FIG. 3 releases a one-shot signal OS to set flip-flops F1, F4 shown in FIGS. 4(A) and 5. Flip-flops F1–F5 are J-K flip-flops changing the state thereof in response to the clock pulses CP1. A counter CT1 shown in FIG. 4(D) initiates to count the clock pulses CP1 upon shifting of the signal C1 to the high-level state. In case the code signal (USASCII) representing a character is composed of 7 bits, said counter CT1 generates, upon counting six clock pulses CP1, a signal CT1-6 to reset the flip-flop F1, whereby the signal C1 shifts from the high-level state to the low-level state to terminate the data write-in into the reigster BR1. The write-in operation of the 7th bit of said code signal is conducted when the signal C1 is shifted to the low-level state by the clock pulse CP1. Also simultaneously with the shift of the signal C1 from the high-level state to the low-level state, the flip-flop F2 is set to the signal C2, in response to which the data stored in the register BR1 are supplied to the detecting circuit DET, and, in the presence of the data, the flip-flop F5 shown in FIG. 6 is set.

When the signals C2, C3 are released, the counter CT1 is reset by the signal C3 and counters CT2, CT3 start to count the clock pulses CP2, CP3. As each character is composed of 7 bits, the data for one character stored in the register BR1 are transmitted to the modulating circuit MOD in response to seven clock pulses CP2. Upon counting seven clock pulses CP2 the counter CT2 releases a signal CT2-7 to reset the flip-flop F2.

Figure 7:
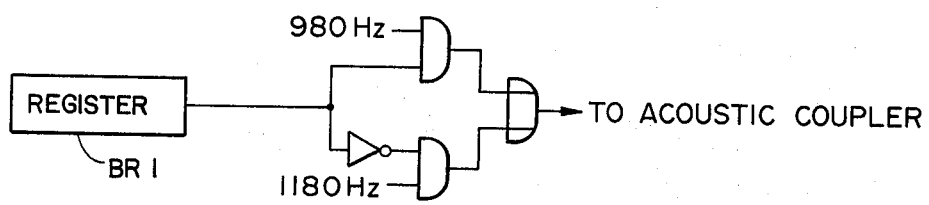
FIG. 7 is a diagram of modulating circuit MOD.
Figure 9:
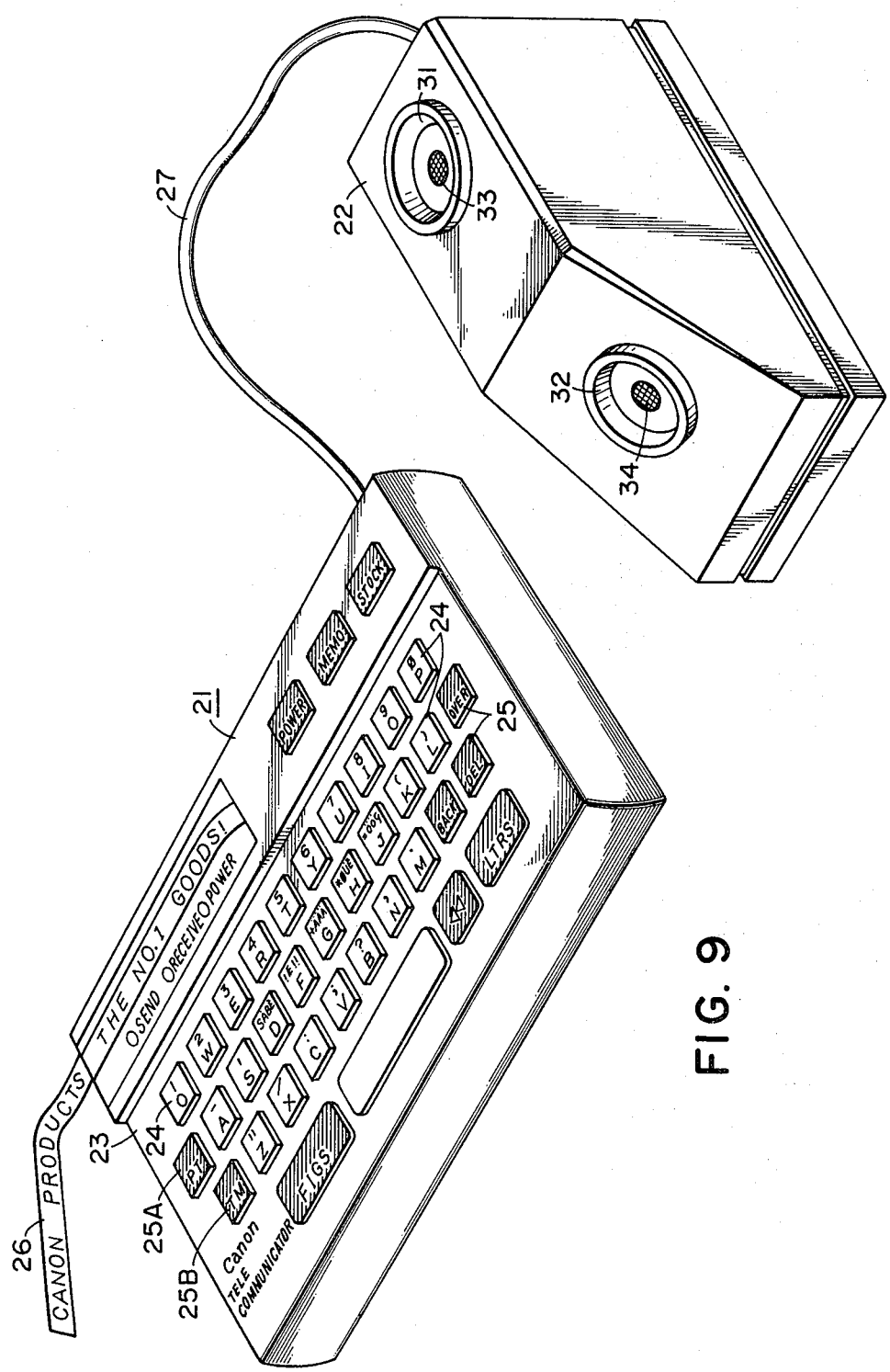
FIG. 9 is a perspective view of the apparatus in which the present invention is applicable.

The signals supplied to the modulator MOD are modulated, as shown in FIG. 7, for example with 980 Hz and 1180 Hz respectively in the high-level and low-level state and supplied to an acoustic coupler shown in FIG. 9.

Although it is now assumed that the print-out is not conducted, the signal C3 is always generated regardless of the presence or absence of the print-out operation for proceeding to the succeeding cycle, so that there will be explained in the following the function in response to said signal C3. It is further assumed that each character is composed of 5×7 dots which are printed by displacing a vertically arranged 7-dot head in the lateral direction in 5 steps by the stepping motor, and is spaced by 2-step distance from the adjacent character.

Figures 8A, 8B:
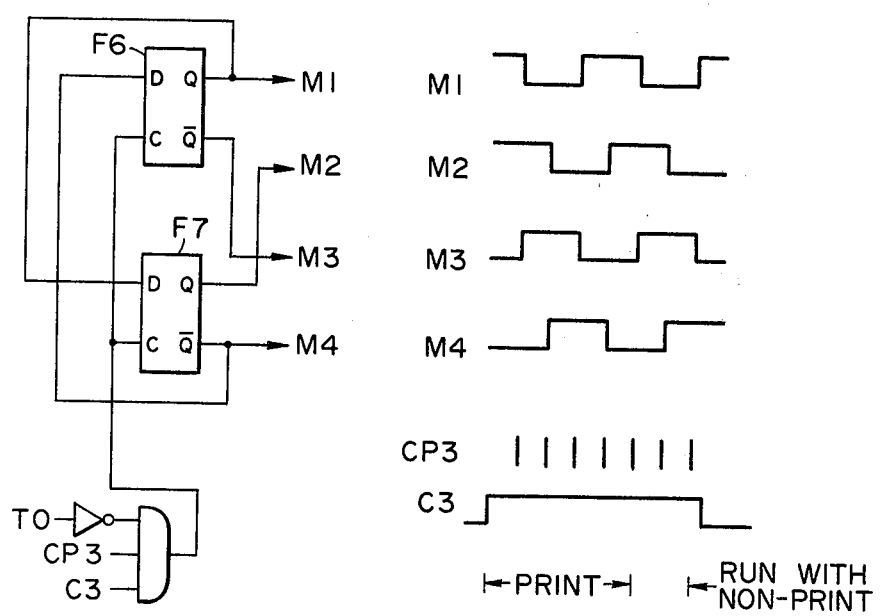
FIG. 8A is a diagram of motor drive pulse generator MPG.
FIG. 8B is a timing chart of motor drive pulses M1-M4.

As shown in FIG. 8A the motor drive pulse generator MPG generates, through D-type flip-flops F6, F7, motor drive pulses M1–M4 as shown in FIG. 8B which are respectively supplied to corresponding four poles of the stepping motor for causing step advancement thereof for each clock pulse CP3, whereby the signal C3 is shifted from the high-level state to the low-level state after seven clock pulses CP3. Upon counting seven clock pulses CP3, the counter CT3 releases a signal CT3-7 to reset the flip-flop F3.

Simultaneously with the shift of the signal C3 from the high-level state to the low-level state, and in the presence of the signal DET, the flip-flop F1 is set to reset the flip-flop F5 releasing said signal DET. Also the counters CT2, CT3 are reset by the signal C1 released upon setting of the flip-flop F1. After the setting of the flip-flop F1, the circuits perform the same functions as explained in the foregoing.

At the third setting of the signal C2 after read-out of two characters from the memory ME1 to the register BR1 in response to two preceding signals C2, the register BR1 supplies no signals because of the absence of data therein, so that the flip-flop F5 of the detecting circuit DET is not set in response to said signal C2. Consequently when the flip-flop F3 for generating the signal C3 is reset the flip-flop F1 for generating the signal C1 is no longer set to terminate the function of various circuits. Also the flip-flop F4 for generating the print-out forbidding signal TO is reset at the shift of the signal C3 from the high-level state to the low-level state subject to the absence of the signal DET.

Now there will be explained the function in response to the entry for example of a numeral "8".

In response to the actuation of a numeral key "8" in the plural input keys, the corresponding key input signal is supplied to the control circuit CON, which thus generates the signal C1 for controlling the signal write-in into the register BR1, signal C2 for controlling the signal transmission to the transmission line and signal C3 for controlling the print-out operation in such a manner that, as shown in FIG. 2A, the signal C1 precedes others and that the signal C3 is released simultaneously with the signal C2 but continues for a longer period. Also in response to the actuation of the numeral key "8", the key circuit KEY generates a signal corresponding to the numeral "8" which is introduced into the register BR1 by means of gate circuits AND1, OR3 controlled by the write-in control signal C1 and the clock pulse CP1. The signal thus introduced into the register BR1 is supplied to the modulating circuit MOD by means of gate circuits AND2, OR3 controlled by the transmission control signal C2 and the clock pulse CP2.

The modulating circuit MOD generates the frequencies of 980 and 1180 Hz according to the code signals "1" and "0" from the register BR1 and supplies thus modulated signals to the transmission line LINE.

On the other hand the signal representing the numeral "8" stored in the register BR2 in synchronization with the control signal C1 and the clock pulse CP1 is decoded by the decoder DEC and supplied to the character generator CG. Upon release of the print-out control signal C3 from the control circuit CON and upon entry of the clock pulse CP3 to the AND gate G1, said gate G1 is opened by the inverter I due to the absence of the signal TO from the memory ME2 in response to the actuation of the key PT, whereby the signal is supplied to the ring counter RC and the motor drive pulse generator MPG. Along with the successive advancement of the state of said ring counter RC by the clock pulses CP3, the pattern signals constituting the numeral "8" are supplied from the character generator CG in succession from the first column to the thermal head SH.

Since said clock pulses CP3 are supplied to the ring counter RC and the pulse generator MPG, the thermal head SH is displaced in synchronization with the supply of pattern signals from the character generator CG whereby the printing is conducted in the order of 1st to 5th column to complete the printing of the numeral "8".

In case actuated is the key PT instructing the print-out and the transmission to the telephone line of the information stored in the memory ME1, the control circuit CON generates the control signals C1–C3 in continuous manner as shown in FIG. 2A. Thus the information supplied at first from the memory ME1 to the registers BR1, BR2 in response to the signals C1, CP1 is printed in synchronization with the signals C3, CP3 in the same manner as the key "8" is actuated, and is also transmitted to the line in synchronization with the signals C2, CP2. Upon completion of the first cycle of the control signals C1–C3 the control circuit CON immediately releases the succeeding control signal C1 whereby the second information is read from the memory ME1, and printed and transmitted in the same manner as the first information. Thereafter the cycles are repeated in the same manner until the detecting circuit DET detects the absence of information left in the memory ME1 when the print-out operation is terminated.

On the other hand in case actuated is the key TM instructing the transmission of information from the memory ME1 to the telephone line but forbidding the print-out, the control circuit CON releases the control signals C1–C3 in a time-sequential manner as shown in FIG. 2A and in the same manner as in the case of actuation of the key PT, and at the same time the memory ME2 memorizes the actuation of the key TM. Said memory ME2 continues to release the signal TO indicating the actuation of the key TM until it is reset by the signal from the detecting circuit DET, said signal TO being supplied through the inverter to the character generator CG and AND gate G1 which thus assume different functions from the foregoing case. In this case the character generator CG does not release output signals, and the AND gate G1 does not generate output signals in response to the clock pulses CP3 even when the control signal C3 is supplied. Consequently the thermal head SH does not receive any signals, and the stepping motor SM does not receive the drive pulses thereby suspending the print-out operation.

As explained in the foregoing, the present embodiment is capable of eliminating the printing of particular information, thus avoiding the unnecessary consumption of expensive thermal paper. It is also economical in the power consumption as the electric power required for print-out is reduced.

FIG. 9 shows an apparatus adapted for the application of the present invention.

In FIG. 9 there is shown a portable typewriter 21 of which keyboard 23 is provided with various print keys 24 and plural function keys 25 for different functions. In response to key input the apparatus performs printing on a thermal recording paper 26 and transmits the modulated signal from said modulating circuit MOD to an acoustic coupler 22 through a cable 27. Said acoustic coupler 22 is provided with recesses 31, 32 in which a telephone handset is to be fitted. Said recesses 31, 32 are respectively provided with a microphone 33 and a speaker 34. Said modulated signal is emitted from said speaker 34 and transmitted to another telephone unit through a telephone line. Also the modulated signal transmitted from another telephone unit is received by said microphone 33, and the demodulated signal RD is supplied through the cable 27 to the typewriter 21, thus performing printing on the thermal paper 26. The circuits shown in FIG. 1 are incorporated in the typewriter 21, while the keys PT and TM are represented by 25A and 25B on the keyboard.

Although the foregoing explanation has been limited to a display by print-out with a thermal head, but the present invention is equally applicable to any other display for example with light-emitting diodes.

As detailedly explained in the foregoing, the apparatus of the present invention having two special keys, one for instructing the information transmission from the memory to the telephone line combined with simultaneous print-out and the other for instructing the information transmission from the memory to the telephone line without the print-out, allows to dispense with the print-out operation in case the information stored in the memory does not require confirmation, thus reducing the consumption of expensive thermal paper and the power consumption for the print-out.

In this manner the present invention enables to conserve energy by selecting either both or either one of first and second processing means having first and second functions. Also it will be understood that the present invention is not limited to the foregoing embodiment but is also subject to various modifications within the scope of the appended claims.

What I claim is:

1. An electronic apparatus comprising:
   a plurality of data input keys for entering data;
   storage means for storing data;
   transmitting means for transmitting directly the data entered by way of said data input keys, and for transmitting from said storage means the data stored therein;
   recording means for recording directly the data entered by way of said data input keys, and for recording from said storage means the data stored therein;
   a first selection key for entering a selection signal;
   holding means for storing said selection signal;
   means responsive to said selection signal stored in said holding means for activating said transmitting means and for inhibiting activation of said recording means, such that in response to said stored selection signal said transmitting means transmits said data stored in said storage means but said recording means does not record said data from said storage means; and
   reset means for resetting said holding means to a state in which said selection signal is not being stored when the transmission of the data from said storage means is completed.

2. An electronic apparatus according to claim 1 further comprising:
   a second selection key; and
   means responsive to the actuation of said second selection key for activating simultaneously said transmitting means and said recording means such that said data stored in said storage means is transmitted by said transmitting means and recorded by said recording means.

3. An electronic apparatus according to claim 1 wherein said reset means has detecting means for detecting that the transmission of said data from said storage means is completed.

4. An electronic apparatus according to claim 1 further comprising receiving means for receiving data from an external source and providing said received data to said recording means.

5. An electronic apparatus according to claim 1 wherein said transmitting means further comprises an acoustic coupler for coupling said data entered by way of said data input keys with a telephone line through which said data is transmitted.

* * * * *